April 28, 1942.       G. P. VINCENT       2,280,938
PREPARATION OF CHLORINE DIOXIDE, CLO₂
Filed Oct. 24, 1939       3 Sheets-Sheet 2

INVENTOR
*George Paul Vincent*
BY
*Pennie, Davis, Marvin & Edmonds*
ATTORNEYS

April 28, 1942.  G. P. VINCENT  2,280,938
PREPARATION OF CHLORINE DIOXIDE, CLO$_2$
Filed Oct. 24, 1939  3 Sheets-Sheet 3
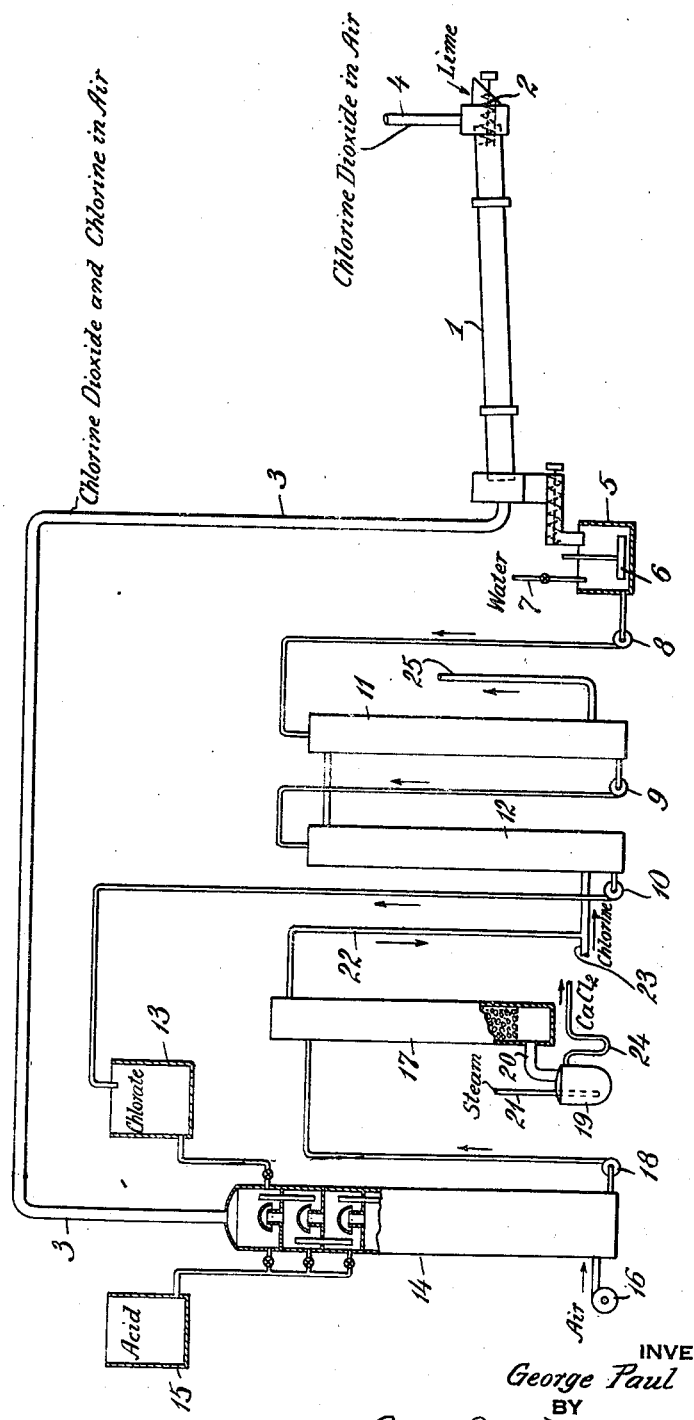
INVENTOR
George Paul Vincent
BY
Pennie, Davis, Marvin & Edmonds
ATTORNEYS Patented Apr. 28, 1942

2,280,938

UNITED STATES PATENT OFFICE 2,280,938

PREPARATION OF CHLORINE DIOXIDE, ClO$_2$

George Paul Vincent, Poughkeepsie, N. Y., assignor to The Mathieson Alkali Works, Inc., New York, N. Y., a corporation of Virginia Application October 24, 1939, Serial No. 301,066

21 Claims. (Cl. 23—152)

This invention relates to improvements in the manufacture of chlorine dioxide. The primary product of the improved process of the invention is a gas mixture comprising chlorine dioxide and chlorine, in which the relative proportion of chlorine dioxide with respect to chlorine is high. Such a gas mixture in itself may be used directly for various purposes, or if substantially pure chlorine dioxide is desired, the chlorine can readily and effectively be separated from the gas mixtures produced according to the present process by known methods, such as, for example, those described in U. S. Patents Nos. 2,036,311, 2,036,375 and 2,108,976.

More particularly, the present invention provides a method for precisely proportioning the reacting substances in a manner and under conditions which produce maximal yields of chlorine dioxide from chlorates. The process of the invention is carried out in an aqueous medium in which are present chlorate ions supplied by any soluble chlorate, preferably an alkali metal, alkaline earth metal, or magnesium chlorate, or by chloric acid; chloride ions provided by any soluble metal chloride or by hydrochloric acid; and hydrogen ions provided by a soluble inorganic acid, such as, for example, hydrochloric acid, sulfuric acid or phosphoric acid. For most efficient operation the reaction solution should contain more than 50% water by weight on the total reaction mixture, the proportion of water being with particular advantage maintained within the range of 50% to 75%. The reaction temperature should be maintained within the range 15° C. to 60° C. for best results.

The products resulting from subjecting soluble chlorates to the action of inorganic acids in aqueous solution have long been known. Under the most frequently encountered reaction conditions, chlorine is the predominant gaseous product. Under other conditions chlorine dioxide has been produced, usually in insignificant proportions. Under certain other specific conditions, for example in the presence of concentrated sulfuric acid or sulfuric acid and a reducing agent, chlorine dioxide is the predominant gaseous product. Such a method heretofore proposed using oxalic acid as the reducing agent involves the following reaction:

(1) $2NaClO_3 + H_2SO_4 + H_2C_2O_4 \rightarrow$
$Na_2SO_4 + 2CO_2 + 2H_2O + 2ClO_2$ A further proposed method which in addition produces perchloric acid involves the use of concentrated sulfuric acid in accordance with the following reaction:

(2) $6NaClO_3 + 3H_2SO_4 \rightarrow$
$3Na_2SO_4 + 2HClO_4 + 2H_2O + 4ClO_2$ Both of these processes have failed to attain commercial significance because of the hazards involved, because of the fact that a chlorate or chlorate liquor substantially free of chloride is required as a starting material, thus increasing the cost of the chlorate, and because concentrated solutions are called for which necessitate the handling of heavy slurries of reacting materials. Furthermore, with respect to an operation in accordance with Equation 1 an expensive organic reducing agent is required and the resulting chlorine dioxide is contaminated with an equivalent quantity of carbon dioxide. In an operation in accordance with Reaction 2 on the other hand, where no organic reducing agent is present, a recovery of only two-thirds of the chlorate as ClO$_2$ represents the maximum theoretical yield. A further difficulty in connection with Reaction 2 resides in the fact that under reaction conditions frequently encountered decomposition in accordance with the following equation takes place, thus further reducing the yield of chlorine dioxide and contaminating the product with larger proportions of undesired chlorine:

(3) $8HClO_3 \rightarrow 4HClO_4 + 3O_2 + 2H_2O + 2Cl_2$

Furthermore, the very great hazards involved in handling chlorates in the presence of concentrated sulfuric acid and perchloric acid preclude the extensive commercial use of such processes.

It has long been known that chlorates when reacted with large quantities of hydrochloric acid at elevated temperatures produce a gaseous product consisting chiefly or solely of chlorine. Representing chlorate as chloric acid, the reaction by which this occurs, using two mols of chlorate, is:

(4) $2HClO_3 + 10HCl \rightarrow 6H_2O + 6Cl_2$

It has also been known that an additional reaction in the form of a side reaction may occur when a chlorate is reacted with HCl in accordance with which chlorine dioxide and chlorine are produced:

(5) $2HClO_3 + 2HCl \rightarrow 2H_2O + Cl_2 + 2ClO_2$

Investigators have studied these reactions, but so far as I am aware have never found the proper conditions under which to operate, or the proper proportioning of reacting materials to effect an efficient production of chlorine dioxide with respect to chlorate decomposed, or with respect to the yield of chlorine dioxide from a given quantity of starting chlorate, or to so minimize the operation of Reaction 4 that the proportions of two volumes of chlorine dioxide to one volume of chlorine as represented in Equation 5 are achieved or even approached. The proper conditions and proportions of reagents for the effecting of Reaction 5 from the point of view of the efficient utilization of the raw materials commercially available have been even less understood. It will be appreciated from the discussion thus far that in view of the disadvantages attendant upon the use of processes for the direct production of ClO₂ free of Cl₂ such as those of Equations 1 and 2, the highest theoretical yield attainable by safe methods is 2 volumes of ClO₂ per volume of Cl₂ in accordance with Equation 5. Due to the predominance of Reaction 4, however, such a theoretical ratio has not been approached, and the recovery of ClO₂ in terms of chlorate decomposed has been very low.

The present invention is directed to the promotion of Reaction 5 to the exclusion of Reactions 1 to 4. Reactions 1 to 3 may be substantially eliminated by conducting the reaction in the absence of organic matter, and by using soluble chlorates, chlorides and acids in a reaction mixture containing in excess of 50% water. In addition to these conditions the reaction should be carried on at a temperature below about 60° C. in order to further minimize Reaction 4.

The soluble chlorates employed in the process of my invention may be chosen from the alkali metal chlorates, the alkaline earth metal chlorates including magnesium or chloric acid. The chloride ion may be supplied to the reaction mixture by an alkali metal chloride, an alkaline earth metal chloride including magnesium chloride or by hydrochloric acid. Mixtures of soluble chlorates and of soluble chlorides, or mixtures of these salts and the corresponding acids may also be employed in the reaction as the source of the chlorate and chloride ions respectively. The necessary concentration of hydrogen ion may be provided by a soluble non-oxidizing inorganic acid, such as for example hydrochloric acid, sulfuric acid or phosphoric acid. The following equations will serve to illustrate various forms of the general Reaction 5 involved in the process of the present invention, and which it is an object of the invention to promote to the exclusion of reactions illustrated by Equation 4.

(6)  $2NaClO_3 + 4HCl \rightarrow 2NaCl + 2H_2O + Cl_2 + 2ClO_2$
(7)  $Mg(ClO_3)_2 + 4HCl \rightarrow MgCl_2 + 2H_2O + Cl_2 + 2ClO_2$
(8)  $2KClO_3 + CaCl_2 + 2H_2SO_4 \rightarrow K_2SO_4 + CaSO_4 + 2H_2O + Cl_2 + 2ClO_2$
(9)  $Ca(ClO_3)_2 + CaCl_2 + 2H_2SO_4 \rightarrow 2CaSO_4 + 2H_2O + Cl_2 + 2ClO_2$ Other combinations of soluble chlorates, chlorides and acids may be used. The use of an acid and a chlorate and/or chloride reacting to produce a precipitated solid, calcium chlorate or calcium chloride reacting with sulfuric acid to produce calcium sulfate for example, is less advantageous from a practical point of view than the use of chlorates, chlorides and acids which do not react to form such precipitates, calcium chlorate with hydrochloric acid or sodium chlorate with sulfuric acid for example. With proper proportioning of reacting materials to effect an efficient production of chlorine dioxide with revision for the removal of such precipitates however, even the combinations of reactants which do produce insoluble precipitates may be used with advantage in the process. The permissible latitude in the composition of the starting solution in accordance with my invention is of great practical importance and is in fact one of its outstanding advantages. As will be more fully explained below, the ratio of chloride ion to chlorate ion in the reaction mixture is of importance to the attainment of best results, excessively high $Cl^-/ClO_3^-$ being detrimental. In large scale production, however, cost of operation is a controlling factor and the chlorate most readily available to the manufacturer should be used if possible. The cheapest source of calcium chlorate is the process in which lime is chlorinated to excess as follows:

(10)  $6Ca(OH)_2 + 6Cl_2 \rightarrow 5CaCl_2 + Ca(ClO_3)_2 + 6H_2O$

The $Cl^-/ClO_3^-$ of 5:1 in the resulting solution may be reduced to 2:1 by crystallization methods but at added expense, while the production of $Ca(ClO_3)_2$ free of $Cl^-$ involves a substantially increased expense. The present invention provides a method of utilizing such a 5:1 liquor and obtaining therefrom the highest possible yields of ClO₂. In preparing such a chlorate-chloride mixture for the production of ClO₂, however, care should be taken to prevent the production of any substantial proportion of hypochlorite. Hypochlorites and acid give rise to chlorine gas with no chlorine dioxide according to the equation

(11)  $HOCl + HCl \rightarrow Cl_2 + H_2O$

Hypochlorite-free chlorate liquor may be prepared by over-chlorinating lime at a temperature in excess of about 60° C. and then clarifying to remove suspended basic hypochlorite solids. Sodium chloride may be electrolyzed to produce a solution containing approximately 2 mols of NaCl to 1 mol of NaClO₃. Evaporation and crystallization to produce pure NaClO₃ is an added expense. Similarly production of pure KClO₃ by the addition of KCl to a 2:1 KCl—KClO₃ liquor involves added expense. As indicated, the chlorates or chlorate liquors most conveniently available for the production of ClO₂ will be those made by cheap commercial processes such as the chlorination of lime or the electrolysis of sodium chloride. The present invention permits the use of any of these and other chlorates in whatever form available and provides a method for obtaining a maximum yield of ClO₂ therefrom so that the overall reaction is the one most economically feasible for each operator.

In order that a more complete understanding may be had of the interrelationship of the variable factors involved in the operation of the process of the invention, reference will be had to the appended drawings in which Fig. 1 is a curve showing the relationship between "efficiency" and chlorine-chlorine dioxide gas ratios in the effluent gas.

Fig. 7 illustrates diagrammatically and conventionally one form of apparatus for carrying out a cyclic process for the preparation of chlorine dioxide substantially free of chlorine and which may include as one step a particularly advantageous embodiment of the present invention.

In carrying out the reaction to produce $ClO_2$ from chlorate the operator strives primarily for the attainment of a high yield of $ClO_2$ based on the chlorate in the starting solution, and concurrently therewith for the attainment of a continuously high ratio of $ClO_2$ to $Cl_2$ in the effluent gas. The former is governed in part by the extent to which decomposition of the chlorate occurs, and both are related to the extent to which the operator is successful in promoting Reaction 5 and minimizing Reaction 4. I have selected the term "efficiency" (E) to express that fraction of the chlorate decomposed which yields chlorine dioxide and the term as used herein and in the claims has such a meaning. The phrase "chlorate decomposed" (D) as used herein refers to the proportion of the chlorate subjected to reaction conditions which has undergone reaction to form other products, and the term "yield" (Y) is used to designate the chlorine dioxide produced in terms of the total chlorate available for reaction. From this it will be apparent that the maximum possible yield of $ClO_2$ is equal to the decomposition $x$ efficiency, $Y = D \times E$. In securing maximal decomposition and efficiency and hence yield accompanied by high $ClO_2$—$Cl_2$ gas ratios, I have found that the most important of the variable factors which must be controlled is the concentration of hydrogen ion, i. e. the equivalent weight of acid, with respect to the concentration of chlorate ion which is added to the reaction mixture. I have also found that the most advantageous acid-chlorate ratio to be used is in turn a function of the ratio of the concentration of chloride ion to chlorate ion present in the reaction mixture.

As stated, in actual practice Reactions 4 and 5 take place concurrently in solution. Since "efficiency" as above defined represents that fraction of the starting chlorate undergoing decomposition which yields $ClO_2$, it may be said from Equations 5 and 4 respectively that:

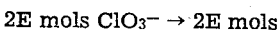 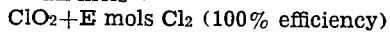
2E mols $ClO_3^- \rightarrow$ 2E mols $ClO_2$ + E mols $Cl_2$ (100% efficiency)

and

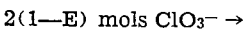 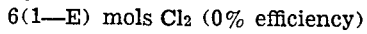
2(1—E) mols $ClO_3^- \rightarrow$ 6(1—E) mols $Cl_2$ (0% efficiency)

Figure 1:
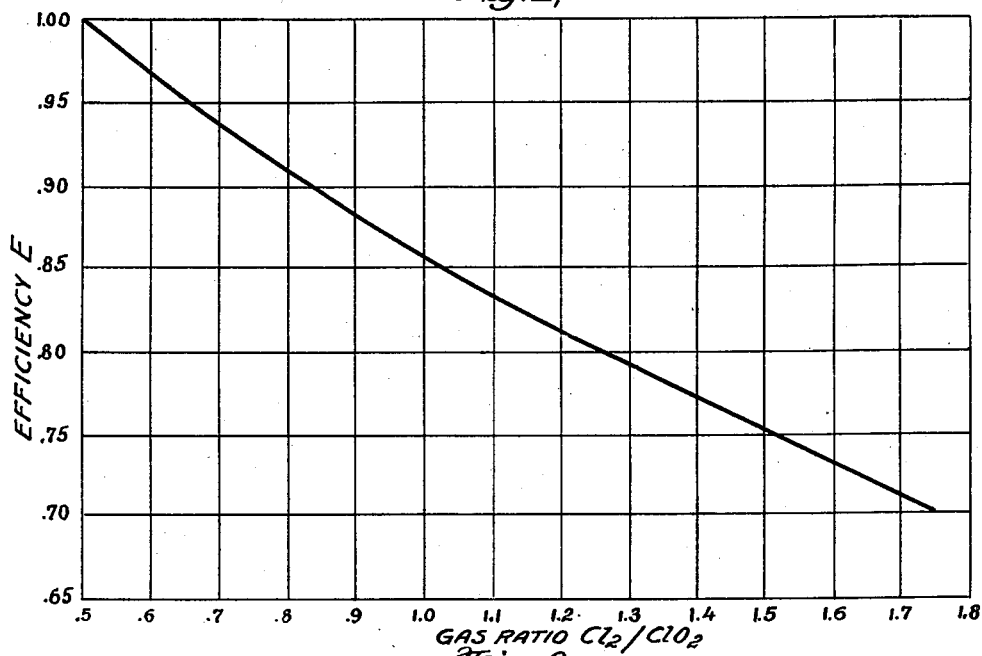

Inasmuch as the result of the operation is the sum of these two reactions, it may be deduced that the effluent gas from the reaction mixture will have a $Cl_2/ClO_2$ gas ratio $r$ equal to 6—5E/2E. In Fig. 1 has been plotted the relationship between efficiency E and $Cl_2/ClO_2$ ratio. From this curve the efficiency of any reaction may readily be determined if the gas ratio is known, and vice versa.

Figure 2:
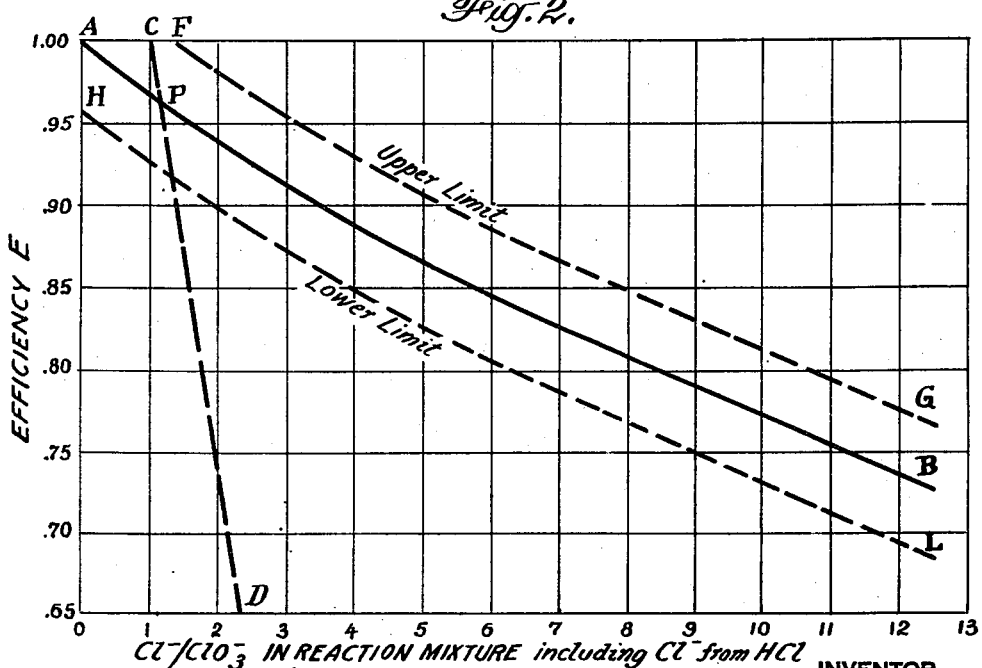
Fig. 2 represents a plot of experimentally obtained "efficiencies" as a function of the ratio of the total chloride ion added to chlorate ion initially present, and also a curve showing the chloride consumed per mol of chlorate decomposed.

While the amount of chloride present in the reaction mixture relative to the initial chlorate content is not "critical" in the sense that it must always have a definite value to give a successful operation, it is of great "relative" importance in the proper carrying out of the reaction. As a result of a large number of experiments carried out under carefully controlled conditions, I have determined that the efficiency of any chlorate decomposition in accordance with Reactions 4 and 5 is a function of the $Cl^-/ClO_3^-$ ratio. In Fig. 2 are plotted the results of these many experiments in which $Cl^-/ClO_3^-$ ratios ranging from the minimum required (see below) to ratios approximating 12.5:1 were employed. In referring to the $Cl^-/ClO_3^-$ ratio, reference is had to the total mols of chloride ion present in the solution including both the amount present at the start in the form of salt and also the amount added with the hydrochloric acid when this acid is employed, and to the mols of chlorate ion initially present in the starting liquor. In my use of the phrases "$Cl^-/ClO_3^-$" and "$H^+/ClO_3^-$" ratios herein, I intend to refer to the molar equivalent ratios of these ions potentially available, regardless of the degrees of ionization of the various salts and of the acid, and the resulting question of the actual concentration of ions present at any given time. For example, a solution containing one mol of $NaClO_3$ and 1 mol of $CaCl_2$ is said to have a $Cl^-/ClO_3^-$ ratio of 2:1. In Fig. 2 the curve AB represents a mean of the many experimental results showing the average gas efficiency which may be expected with any particular $Cl^-/ClO_3^-$ ratio. The various points plotted to arrive at the curve AB are slightly dispersed due to secondary causes or experimental error, but substantially all lie within a narrow band defined in Fig. 2 by the upper limit curve FG and the lower limit curve HL. From these curves it will be seen that with increasing $Cl^-/ClO_3^-$ ratios the attainable efficiency declines. The data for these curves were obtained from reactions employing various chlorates and chlorides with hydrochloric or sulfuric acid and containing between 50% and 75% $H_2O$ in the final mixture. The reaction temperature in each instance was between 20° C. and 40° C.

The observed lowered efficiencies with increased chloride concentration are in accordance with Equations 4 and 5. A preponderance of Reaction 4 yielding only chlorine and thus lowered efficiencies demands increased proportions of chloride ion and also hydrogen ion. Considering known Equations 4 and 5 and the methods of operating known to the art, it would be expected that to approach the $Cl_2$—$ClO_2$ ratios of Equation 5, the proportions of reagents therein designated should be employed, particularly since increasing them would appear to favor the chlorine reaction. I have found, however, that this is not the case, and that quantities of chloride and acid must be supplied in increased amounts according to a schedule based upon the above described experimental efficiencies. For each mol of $ClO_3^-$ decomposed according to Reaction 5, there is required E mols of $Cl^-$ and 2E mols of $H^+$; and according to Reaction 4 5(1—E) mols of $Cl^-$ and 6(1—E) mols of $H^+$. In an actual operation where both reactions are occurring the $Cl^-$ requirement is therefore 5—4E and the $H^+$ requirement as stated is 6—4E. To whatever extent either chloride or acid is deficient for these requirements, the maximum possible decomposition of chlorate, and therefore yield of $ClO_2$, is limited, although the efficiency of the reaction with respect to the chlorate which does decompose may be high. In Fig. 2 the line CD represents the chloride consumed per mol of chlorate decomposed at any given efficiency. This line intersects the operating curve AB at the point P. To the left of P the decomposition is limited to less than 100% by deficiency in $Cl^-$. To the right of P 100% decomposition of chlorate is theoretically possible provided a sufficient quantity of acid is present. The quantity of acid constituting a sufficient amount will vary with the chlorate concentration and the chloride concentration. In operations where the $Cl^-/ClO_3^-$ ratio is in excess of 1.15, the E value can be determined from curve AB, and from the line CD the amount of chloride actually consumed per mole of chlorate decomposed may be ascertained.

Figure 3:
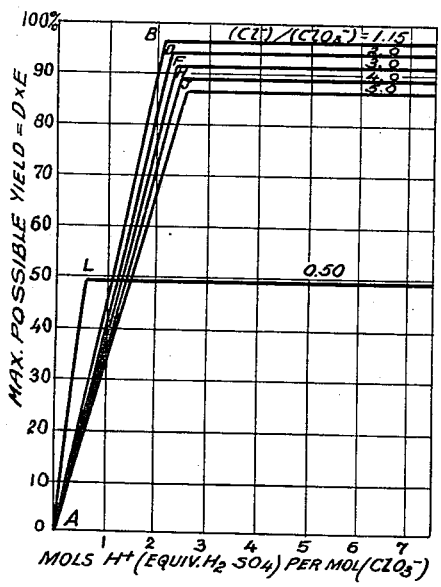
Fig. 3 illustrates the maximum possible yield obtainable for the case in which sulfuric acid is added to various initial mixtures of chloride and chlorate.

Fig. 3 illustrates reactions in sulfuric acid is added to various initial mixtures of chloride and chlorate. For each initial $Cl^-/ClO_3^-$ ratio there is a definite and unique minimum amount of $H_2SO_4$ which must be added in order to permit 100% decomposition of the chlorate and an accompanying maximum yield of $ClO_2$. The actual percentage yield of $ClO_2$ numerically equals the per cent $ClO_3^-$ decomposed $\times$ the efficiency ($Y = D \times E$; therefore per cent $Y =$ per cent $D \times E$). When the $H^+/ClO_3^-$ ratio is less than 6—4E, D is limited to less than 100% with a consequent lessening of Y. In the case of $H_2SO_4$ a $H^+/ClO_3^-$ ratio in excess of the minimum required does not decrease the yield. It will further be noted that the maximum possible yield of $ClO_2$ is obtained when $Cl^-/ClO_3^-$ equals 1.15 and not 1.0 as indicated by the equation. This unique value 1.15 appears in Fig. 2 as the point P which is located at the intersection of the efficiency curve AB and the curve CD, the latter curve representing the ratio of mols of chloride ion consumed to mols of chlorate ion decomposed during the reaction. Furthermore, to produce such a yield in this instance the $H^+/ClO_3^-$ must not only be in excess of 2, but in excess of a unique value greater than 2. The value 1.15 represents a minimum value of $Cl^-/ClO_3^-$ for the attainment of a maximum yield regardless of the acid used. In the case of HCl, however, this value will of necessity be exceeded because of the requirement for greater quantities of $H^+$. The point L demonstrates the rapidity with which the yield drops when the $Cl^-/ClO_3^-$ is reduced to 0.50. In reactions involving inorganic acids free of chloride ions as exemplified by $H_2SO_4$, and in which the $Cl^-/ClO_3^-$ is adjusted to about 1.15 as will be seen from curve ABC of Fig. 3, at least 2.15 equivalents of acid per equivalent of chlorate initially present are required for a maximum $ClO_2$ yield. This $H^+/ClO_3^-$ ratio for the case in which the $Cl^-/ClO_3^-$ ratio equals 1.15 may be determined from Fig. 2, by substituting the E value corresponding to the point P in the formula 6—4E. In solutions in which the $Cl^-/ClO_3^-$ ratio approximates 2, the $H^+/ClO_3^-$ ratio should be regulated to a value as great as or in excess of 2.25, and when the $Cl^-/ClO_3^-$ ratio approximates 5, the $H^+/ClO_3^-$ should be regulated to a value as great as or in excess of 2.55.

Figure 4:
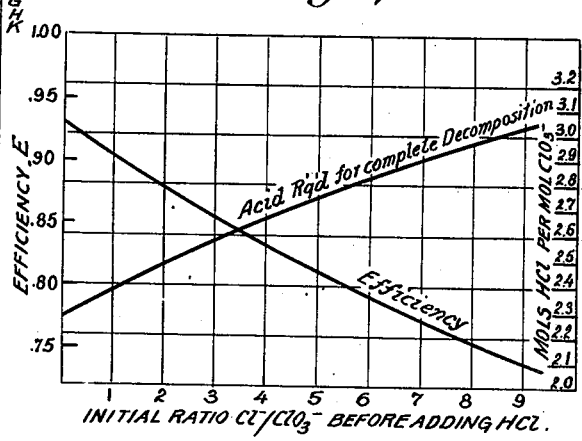
Fig. 4 illustrates the case where hydrochloric acid is added to varying chloride-chlorate mixtures and shows the critical HCl requirements to produce 100% decomposition of the chlorate and also the "efficiencies" expected under these conditions.

In chlorate decomposition reactions in which HCl is the acid used, it is desirable to regulate the maximum amount of acid added more nearly to the exact value required to produce the maximum yield of $ClO_2$. This results from the fact that HCl contributes $Cl^-$ in excessive amounts as well as the desired amount of $H^+$, and that with increasing $Cl^-$ concentration the efficiency drops due to the production of greater quantities of $Cl_2$. In Fig. 4 have been plotted the critical HCl requirements for the production of maximum yields of $ClO_2$ and also the corresponding efficiencies obtained under these conditions. The "acid required" and efficiency curves are shown extended to points at which the ratio of total chloride ion after addition of HCl to initial chlorate ion approximates 12.5. From the curves in Fig. 4 it may be seen that the acid required for complete decomposition of chlorate and thus for maximum possible yield of $ClO_2$ increases steadily with an increased initial $Cl^-/ClO_3^-$ ratio and that as this ratio is increased the efficiency of the reaction drops accordingly. For example, when there is no chloride initially present, approximately 2.28 mols HCl per mol of $ClO_3^-$ are required; when the initial $Cl^-/ClO_3^-$ ratio is 2, the acid-chlorate ratio should approximate 2.48; and when the initial $Cl^-/ClO_3^-$ ratio is 5, the acid-chlorate ratio should approximate 2.75. It will be apparent that the $Cl^-/ClO_3^-$ ratio of total $Cl^-$ in the reaction mixture in the latter two cases will be 4.48 and 7.75 respectively.

Figure 5:
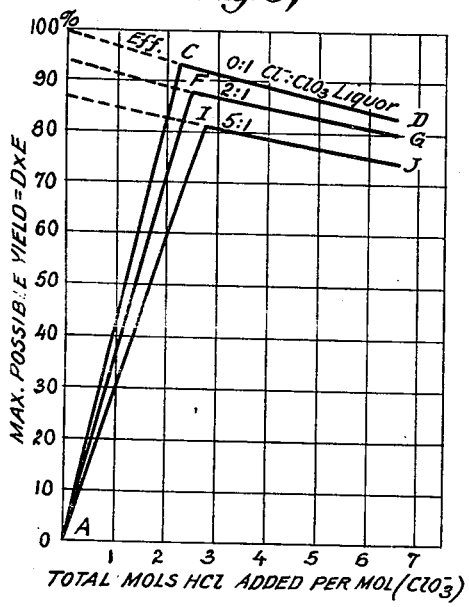
Fig. 5 illustrates the maximum possible yields obtainable for the case in which hydrochloric acid is added to solutions having various initial chloride-chlorate ratios.

In Fig. 5 is illustrated the manner in which the maximum possible yield of $ClO_2$ reaches a maximum for different $Cl^-/ClO_3^-$ ratios at unique acid-chlorate ratios when HCl is the acid used. Curves ACD, AFG and AIJ in this figure represent starting solutions containing chlorate free of chloride, a 2:1 chloride-chlorate ratio and a 5:1 chloride-chlorate ratio respectively. The effect of variations in the quantity of HCl added is clearly shown in this figure and it will be apparent that for most efficient operation an amount of acid in the vicinity of that producing the maximum yield is desirable. It will also be apparent from the marked difference in the slopes of the two segments of the curves on each side of the maxima that the latitude with respect to the desirable $H^+/ClO_3^-$ ratio is greater on the high side than on the low side, and that an operation wherein the $HCl/ClO_3^-$ ratio may be somewhat greater than the ratio giving the maximum possible yield will be quite feasible. I have found in practice for example that HCl sufficient to give $H^+/ClO_3^-$ ratios of 3:1 and even as high as 3.5:1 give satisfactory results. This is particularly true in using liquors wherein the initial chloride to chlorate ratio is 5:1. In Fig. 5 the efficiency for any given acid addition to one of the three chloride-chlorate liquors plotted may also be determined by readings on the upper sections of the curves.

Figure 6:
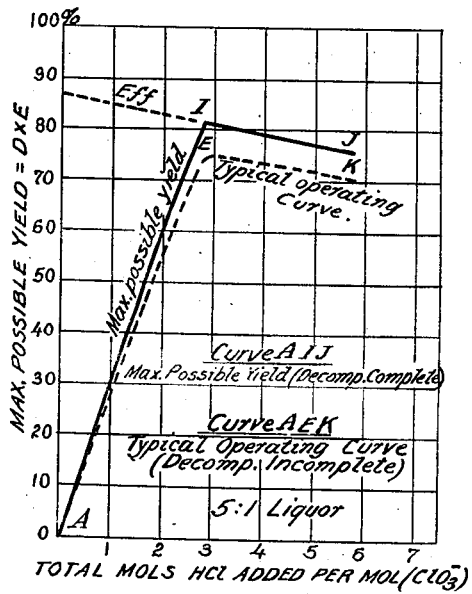
Fig. 6 illustrates the maximum possible yield obtainable for the case in which hydrochloric acid is added to a solution having an initial $Cl^-/ClO_3^-$ ratio of 5:1, and shows further the relationship of a typical operating curve to these values.

In Fig. 6 is presented the curve AIJ of Fig. 5, representing a 5:1 chloride-chlorate liquor such as is produced by the chlorination of lime. The point of maximum possible yield, I, represents an efficiency of 81% in a reaction to which 2.75 mols of HCl have been added per mol of $ClO_3^-$. The decomposition reaction of this invention is a very slow reaction requiring a long period to approach the maximum possible complete decomposition. For economic reasons it is desirable in practice to limit the time of reaction to a reasonable figure, for example 7 hours. When this is done, the decomposition and hence the yield falls somewhat short of the maximum possible under the reaction conditions. Curve AEK in Fig. 6 represents a typical operating curve defining a reaction in which the decomposition is incomplete due to the fact that it was terminated after a desired length of time. I have found that in the case of all curves based on actual operations the maxima with respect to yield of $ClO_2$ always occur at substantially the same $H^+/ClO_3^-$ ratio as do the maxima of the corresponding yield curves drawn on the assumption that complete decomposition occurs. From this fact as well as the previous discussion it will be appreciated that great economies of operation are made possible by proportioning the reactants in accordance with the novel methods herein claimed. HCl in some respects is not as desirable an acid for my process as $H_2SO_4$. In some localities, however, HCl may be obtained very cheaply and its use will, therefore, be preferable to other acids in large scale operation. In addition to this the use of sulphuric acid with the cheaply obtainable calcium-chloride calcium-chlorate liquor introduces difficulties with respect to the handling of the calcium sulfate precipitate so that in cases where the calcium salts are to be used the HCl may sometimes be preferable.

In determining the equivalent molar ratio of acid to chlorate, in accordance with the relationship $H^+/ClO_3^- = 6 - 4E$, which should be added to any given starting liquor containing chlorate and chloride to correspond to an operation in the vicinity of the maxima of the yield curves such as those shown in Figs. 3 and 5, the procedure will be slightly different with HCl than with acids which do not introduce additional quantities of $Cl^-$ when added to the solution. In the latter case the acid-chlorate ratio is determined directly by the substituting of the proper E value read from the curve AB of Fig. 2 in the reaction formula. When HCl is used and additional $Cl^-$ thus introduced, however, it is necessary to determine the amount which, when substituted in the said formula, will fit the relationship between E and the total $Cl^-$/initial $ClO_3^-$ ratio shown by curve AB. To illustrate assume a starting liquor containing 5 mols of $Cl^-$ and 1 mol of $ClO_3^-$ and assume that 3 mols of HCl were to be added. The E value from curve AB is 0.81, and when substituted in the formula gives an acid chlorate ratio of 2.76, which indicates that the assumption of 3 mols of acid is slightly high to produce a result in the vicinity of the peak of an HCl yield curve. On the assumption that 2.7 mols of HCl were added, the E value of 0.82 when substituted in the formula gives an $H^+/ClO_3^-$ ratio of 2.72, which closely approximates the 2.7 value assumed, and thus a value which fits the relationship of Fig. 2.

To summarize, in accordance with my invention it is possible to use different acids, different chlorates and different chlorides, the latter two in widely varying concentration relationships, and to obtain maximal yields of $ClO_2$ and the highest possible reaction efficiencies in view of the identity of the starting materials and their concentration relationships. The above described methods of proportioning the reactants to attain these ends consist essentially of reacting in aqueous solution a soluble inorganic chlorate and an inorganic acid in the presence of chloride ion, the proportion of water present being between 50% and 75% by weight of the total reaction mixture, and the reaction temperature being maintained at a value within the range of about 15° C. to about 60° C., while employing during substantially all of the reaction period chloride ion and inorganic chlorate in proportions providing a total chloride to initial chlorate ion ratio not lower than about 1.15, and employing acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and in an amount capable of producing a yield of chlorine dioxide at least as great as that produced by hydrochloric acid when the hydrogen ion to chlorate ion ratio approximates 3.5.

The chlorate decomposition reaction may be carried out in a single reaction vessel in a batch operation, or in a so-called "continuous" operation in a series of interconnected reaction vessels or in a multi-compartment tower. The same reaction conditions and proportions of reagents are used in batch and continuous operations. In a batch process I prefer to add the acid to the chlorate liquor and to add it gradually in order to temper the rate of reaction in the early stages, thus to prevent foaming, and to give a more uniform evolution of gas. After all the acid has been added the reaction is with advantage permitted to continue for a substantial period of time in order to approach as nearly as possible complete decomposition of the chlorate. In carrying out the reaction in a continuous manner which in general is the preferable method, it is desirable that the total volume of solutions in the series of interconnected vessels or in the tower compartments be such as to permit a sufficient holding time to cause the reaction to approach completion. Furthermore, the greater the number of compartments into which the total volume is divided, the more easily complete decomposition is approached. In order to decrease the reaction rate in the upper or first compartment in the series, I prefer to divide the acid flow equally among several of the first compartments in the series, thereby producing the same effect as is obtained by adding the acid gradually in a batch operation. In the present instance a batch process and a continuous process are equivalent with respect to the reaction itself. In batch the acid is added over a relatively short period and the reaction permitted to continue without further additions. In continuous the acid is added to a given quantity of liquor in the first or first several compartments, and the reaction then continues as the solution flows serially through the remaining reaction zones.

An inert diluent gas, air for example, is with advantage used to carry the chlorine dioxide and chlorine from the reaction zone. Such a diluent gas assists in stripping the chlorine dioxide from the reaction mixture as it is formed, thus accelerating the reaction and aiding in carrying it to completion. The inert diluent is preferably forced into and through the reaction solution, thus providing an effective means of agitation whether the reaction vessel be in the form of a vat or of a tower containing reaction zones. In the latter case bubble caps may be provided in the various compartments and the diluent gas introduced into the last of the reaction zones or compartments whence it passes successively and countercurrently to the flow of reacting liquid through the rest of the series, carrying with it the gaseous products of reaction. Such agitation aids in the prevention of local excesses of acid and of areas of high chloride-chlorate ratios when HCl is the acid used, both of which tend to lower the efficiency of the reaction. By greatly lowering the partial pressure of chlorine dioxide in the effluent gas the inert gas further assists in minimizing the explosion hazard. This hazard may be even further minimized by carrying out the reaction in the dark and in the absence of organic matter. Sufficient diluent gas should be added so that $ClO_2$ does not exceed 10% or preferably 5% by volume of the effluent gas mixture.

As above stated the reaction temperature should be maintained between about 15° C. and 60° C. Inasmuch as the reaction is somewhat endothermic, heat is advantageously added in order to force the reaction more nearly to completion and to maintain the reaction mixture within the proper temperature limits. This may conveniently be done by heating the air or other gas introduced as a diluent. I have found in practice that there are preferred limited temperature ranges within the above stated range which are uniquely favorable for specific chlorates. For example, when calcium chlorate is the starting material, temperatures ranging from 15° C. to 30° C. are of special advantage, and in the case of sodium chlorate temperatures ranging from 30° C. to 40° C. are preferred.

As indicated the reaction is a slow one and in a commercial operation it may not be expedient to permit it to continue for the long period required to effect the complete decomposition of the chlorate. After approaching completion to whatever extent is economically feasible, for example at about 75% chlorate decomposition, the remaining chlorate may be rapidly and completely decomposed under conditions which may not yield substantial amounts of $ClO_2$, but which yield products in themselves valuable or of value as intermediates in a cyclic process for the further production of $ClO_2$. This decomposition may conveniently be accomplished by either of two methods or by a combination of the two.

In accordance with the first of the methods the remaining chlorate may be decomposed by the addition of a large excess of acid over and above that called for by the process of the invention. The gases obtained from this decomposition are advantageously collected separately. If the excess acid be HCl, the gases evolved will contain principally chlorine. If the excess acid is other than HCl, e. g. $H_2SO_4$, a gas mixture containing chlorine dioxide and chlorine will be obtained which may or may not be added to the main body of the generated gas. The excess acid used for this purpose may be recovered in any suitable way. For example, if a calcium chlorate-chloride mixture is decomposed with excess sulfuric acid, the precipitated $CaSO_4$ may be removed by filtration and the recovered dilute $H_2SO_4$ concentrated and used for decomposing further quantities of chlorate.

In accordance with the second method, the decomposition may be completed by heating the liquor to temperatures substantially in excess of 60° C., preferably to about 100° C., under which conditions the chlorate is substantially decomposed and yields principally chlorine. The chlorine so recovered may with advantage be used in a cyclic manner to prepare further quantities of chlorate in accordance with the operation described in connection with Fig. 7.

The practice of processes involving the improved features of my invention will be illustrated by the following examples of both small and large scale operation.

Example I 36.3 cc. of 19.5N sulfuric acid were added to 19 cc. of a calcium chlorate-calcium chloride solution, 2.05 molar with respect to calcium chlorate and 4.2835 molar with respect to calcium chloride, diluted with 24 cc. $H_2O$, while maintaining a reaction temperature of 20°-25° C. The acid was added in small increments over a period of 1 hour. The reaction was permitted to continue for a total period of 2 hours. Air was blown through the reaction vessel at a rate of 1 liter per minute. The partial pressure of chlorine dioxide in the generated gas mixture did not exceed and remained fairly constant at about 25 mm. of mercury. The equivalent ratio of acid to initial chlorate ion approximated 9:1. The molar ratio of chlorine to chlorine dioxide evolved was 0.612. 99.4% of the chlorate had been decomposed and 94.3% of the chlorine of the decomposed chlorate was recovered as chlorine dioxide.

Example II 25 cc. of 36.0N sulfuric acid were added, at a rate of 0.5 cc. per minute, to 20 cc. of a calcium chlorate-calcium chloride solution, 0.97016M with respect to calcium chlorate and 4.8965M with respect to calcium chloride, diluted with 53 cc. $H_2O$, while maintaining a reaction temperature of 22° C. Air was blown through the reaction mixture at a rate sufficient to limit the maximum partial pressure of chlorine dioxide in the evolved gas mixture to about 30 mm. of mercury. The molar ratio of chlorine to chlorine dioxide evolved was 0.95. The equivalent ratio of acid to initial chlorate ion approximated 23:1. 98.7% of the chlorate had been decomposed and 87.5% of the chlorine of the decomposed chlorate was recovered as chlorine dioxide.

In these examples a large excess of sulfuric acid was used in order to promote complete decomposition of the chlorate, but was added gradually. The chloride-chlorate ratio was 2:1 in Example I and 5.05:1 in Example II. The yield of $ClO_2$ based on the starting chlorate was 93.6% in Example I and 86.3% in Example II. The efficiency value for the 2:1 liquor was 94.3% and 86.3% for the 5.05 liquor. The excess acid may be recovered for reuse.

Example III 106.5 kg. of pure sodium chlorate were dissolved in an equal weight of water and brought to 25° C. 350 kg. of hydrochloric acid, 32% HCl, were added, over a period of 60 minutes, to this solution, air being blown through the solution at the rate of 4,000 liters per minute during this period. About 33.7 kg. of chlorine dioxide had been recovered at the end of this period as an air-gas mixture including about 5% $ClO_2$ by volume. Aeration was continued at a reduced rate for an additional 6 hours. The equivalent ratio of acid to initial chlorate ion approximated 18:1. Over the seven-hour period, 91% of the chlorate decomposed and 54.8 kg. of chlorine dioxide were recovered. The efficiency value for the operation was 89% and the yield of $ClO_2$ based on the starting chlorate 81%.

Example IV

An aqueous solution containing 128 g. p. l. (0.618 mols per liter) of calcium chlorate and 362 g. p. l. (3.263 mols per liter) of calcium chloride was supplied to the first of a series of 3 reaction vessels having a capacity of 9,400 cc. each, at a rate such that the solution holding time in the 3 vessels approximated 11 hours. Hydrochloric acid (12.16M) was added to the first 2 vessels in an amount such that the $H^+/ClO_3^-$ ratio approximated 2:1 in the first vessel and 1:1 in the second vessel. The total HCl added had a molar ratio of 3:1 on the basis of the chlorate in the solution fed to the first reaction vessel. The total $Cl^-/ClO_3^-$ ratio, therefore, approximated 8:1. At the end of this time 83% of the chlorate had decomposed to give products having an average $Cl^-/ClO_2$ gas ratio of 1.23. This corresponds to an efficiency value of 80.8%. The yield amounted to 67.1% of the total chlorate originally present in the solution.

*Example V*

30 cc. of 36N sulfuric acid were added, at a rate of 0.5 cc. per minute, to a solution of 7.53 gms. of potassium chlorate and 9.74 gms. of calcium chloride tetrahydrate in 63.2 cc. $H_2O$ while maintaining a reaction temperature of 22° C. Air was blown through the reaction mixture at a rate sufficient to limit the maximum partial pressure of chlorine dioxide in the evolved gas mixture to about 30 mm. of mercury. The molar ratio of chlorine to chlorine dioxide evolved was 0.72. 99.3% of the potassium chlorate was decomposed and 93.1% of the chlorine of the decomposed chlorate was recovered as chlorine dioxide. The large excess acid used can be recovered for reuse.

*Example VI*

An aqueous solution containing 2.08 mols per liter sodium chlorate and 4.15 mols per liter sodium chloride and having a specific gravity of 1.28 was continuously supplied to the first of a series of 3 reaction vessels at such a rate that the holding time in the 3 vessels was 7 hours. Hydrochloric acid was added to the first and second reaction vessels in an amount such that the $H^+/ClO_3^-$ ratio for both vessels approximated 2.4:1. Approximately twice as much acid was added to the first vessel as to the second. At the end of the 4th hour 75% of the chlorate had been decomposed and the chlorine dioxide obtained up to that point corresponded to a 69.2% yield based on the total chlorate initially present. The total gas ratio of chlorine to chlorine dioxide was 0.76 and the efficiency value 92%. At the end of 7 hours 82.7% of the chlorate had been decomposed, 91% thereof having been transformed to chlorine dioxide giving a total yield of $ClO_2$ for the entire period of 75.2% the overall gas ratio being equal to 0.80%.

One advantageous large scale operation involving the method of proportioning the above described variable factors in accordance with the present invention permits the use of the process in a continuous cyclic operation in which lime, chlorine and an acid are the starting materials and chlorine dioxide substantially free of chlorine the finished product which is removed from the system. Fig. 7 of the drawings illustrates diagrammatically and conventionally one form of apparatus for carrying out such a process, including one particularly advantageous embodiment of this invention as a step in the cyclic process.

In such an operation a calcium chloride-calcium chlorate liquor prepared in the process is continuously decomposed by an acid, for example HCl to produce a $ClO_2$—$Cl_2$ gas mixture rich in $ClO_2$. Lime is passed into and through a rotary contact chamber 1 through a feeding mechanism 2, countercurrent to a gaseous mixture of chlorine dioxide and chlorine in air which enters the contact chamber through duct 3. Contact chamber 1 is provided internally with lifts to shower the lime through the gas stream. A separation of chlorine from the gas mixture is effected in this contact chamber as described in my U. S. Patent No. 2,036,375, issued April 7, 1936. The chlorine dioxide and air, substantially free of chlorine, is discharged through duct 4. The partially chlorinated lime produced by this gas separation is passed to a tank 5 where it is stirred into a slurry by stirrer 6 in the presence of water introduced through connection 7. By means of pumps 8 and 9 this slurry is successively passed through towers 11 and 12 in which it is further chlorinated to produce a calcium chloride-calcium chlorate liquor which is passed by pump 10 to tank 13. Towers 11 and 12 are conventional tile packed towers. The slurry is largely chlorinated in tower 12, tower 11 serving primarily to complete recovery of chlorine, the spent gas substantially free of chlorine being removed through exit pipe 25. The decomposition of the chlorate liquor passed to tank 13 in accordance with the present invention is effected in tower 14, a conventional stoneware bubble plate tower. The chlorate liquor is supplied to the top plate and an acid, for example hydrochloric acid, is introduced from tank 15. This acid is advantageously introduced in part into each of the uppermost two or three compartments, for the reasons discussed above. Air is forced into the lower end of the tower by means of blower 16 and passes upwardly through the tower carrying with it the generated chlorine-chlorine dioxide mixture, said mixture being discharged from the tower through duct 3. The overflows in the various compartments are with advantage arranged so that the total liquor held on all the plates is of sufficient volume to give a holding time of at least 4 hours for the liquor flowing through the tower. The residual liquor containing calcium chloride and undecomposed calcium chlorate is passed to recovery tower 17 by means of pump 18. Tower 17 is a conventional tile packed tower to the lower portion of which is connected a pot 19 by connection 20. Steam is blown into this pot through connection 21 at a rate sufficient to heat the entering liquid to its boiling point. The evolved vapor mixture, steam, chlorine and chlorine dioxide passes upwardly through the tower 17 in which the greater part of the steam is condensed by the residual liquor passing downwardly therethrough. The gas mixture escaping from the tower, of which chlorine is the predominating constituent, is delivered by duct 22 to the lower portion of chlorination tower 12. The additional chlorine required to complete the chlorination of the slurry effected in tower 12 may be added through connection 23 or directly to the tower. The residual liquor from the decomposition pot 19, an aqueous solution of calcium chloride, is discharged through connection 24.

A complete cyclic operation in which a gas mixture of chlorine and chlorine dioxide is separated by selective absorption of the chlorine by lime, the partially chlorinated lime being subjected to further chlorination to form a calcium chlorate-calcium chloride liquor, said liquor being then reacted with hydrochloric acid to form a gas mixture including chlorine and chlorine dioxide, and said mixture then being supplied to the first mentioned separation, is described and claimed in my U. S. Patent No. 2,078,045, granted April 20, 1937.

The practice of a cyclic process embodying the present invention as one step of the cycle, in an apparatus such as that described in connection with Fig. 7 will be illustrated by the following example:

Example VII

Lime, 95% $Ca(OH)_2$, is supplied to the rotary contact chamber, or separator, 1 at a rate of 117.5 pounds per hour. Water is supplied to the tank 5 at a rate of 35 gallons per hour. Air is blown into the tower 14 at a rate of 40 cu. ft. per minute. Chlorine is supplied to the tower 12 at a rate of 84 pounds per hour, 62 pounds per hour as make-up chlorine and 22 pounds per hour as chlorine recovered in the tower 17 and pot 19. Hydrochloric acid, 32% HCl, is supplied to the tower 14 at a rate of 18 gallons per hour. The lime leaving the separator 1 is about 25% chlorinated. The chlorate-chloride liquor supplied to the tank 13 from tower 12, the chlorination being completed at about 50°–80° C., contains about 125 gms. per liter of calcium chlorate and 355 gms. per liter of calcium chloride. This liquor is cooled to 25° C. before entering the tower 14 and, at this temperature, is supplied to the tower 14 at a rate of 47.5 gallons per hour. With a reaction tower, tower 14, consisting of nine chambers each retaining 19 gallons, the reaction time, in the reaction tower, approximates 3.8 hours. With a reaction temperature of 20°–30° C., about 78.4% of the calcium chlorate is decomposed. About 167.4 pounds of calcium chloride are discharged per hour in solution in the liquor from pot 19. Chlorine dioxide is produced at a rate of about 21.7 pounds per hour together with chlorine at the rate of 27.2 pounds per hour, these gases being recovered as a mixture with air containing about 5% by volume of $ClO_2$ discharged through duct 4. The $Cl^-/ClO_3^-$ ratio in the liquor fed to the column is 5.3, the $ClO_3^-$ being fed at the rate of 0.479 lb. equivalents per hour and the $H^+$ at the rate of 1.525 lb. equivalents per hour. The $H^+/ClO_3^-$ ratio is therefore 3.18, an amount slightly in excess of the minimum required, and the total $Cl^-$ to initial $ClO_3^-$ ratio is 8.48. The mixed gases recovered from the reaction tower provided 0.321 lb. mols per hour $ClO_2$ and 0.385 lb. mols per hour $Cl_2$, the $Cl_2/ClO_2$ thus being 1.2. According to Fig. 1 this is equivalent to an efficiency of 0.81. In accordance with Fig. 2, with a total $Cl^-/ClO_3^-$ ratio of 8.48, an average efficiency of approximately 0.80 may be expected.

The present application is a continuation-in-part of my co-pending applications, Serial Nos. 85,667 and 85,668, filed June 17, 1936.

I claim:

1. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate, an inorganic acid and chloride ion, the improvement which comprises employing during substantially all of the reaction period chloride ion and inorganic chlorate in proportions providing a total chloride to initial chlorate ion ratio not lower than about 1.15 and not greater than about 12.5, and employing acid in an amount providing an equivalent molar ratio of acid to initial chlorate not substantially lower than a ratio expressed by the equation $H^+/ClO_3^-=6-4E$ where E is an efficiency value for the reaction falling substantially on the curve AB of Fig. 2 and substantially on the ordinate of the total chloride to initial chlorate ion ratio, and in an amount capable of producing a yield of chlorine dioxide at least as great as that produced by hydrochloric acid when the hydrogen ion to chlorate ion ratio approximates 3.5.

2. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate, an inorganic acid and chloride ion, the improvement which comprises employing during substantially all of the reaction period chloride ion and inorganic chlorate in proportions providing a total chloride to initial chlorate ion ratio not lower than about 1.15 and not greater than about 12.5, and employing acid in an amount providing an equivalent molar ratio of acid to initial chlorate approximating the ratio expressed by the equation of $H^+/ClO_3^-=6-4E$ where E is an efficiency value for the reaction falling substantially on the curve AB of Fig. 2 and substantially on the ordinate of the total chloride to initial chlorate ion ratio.

3. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and chloride ion in proportions such that the chloride to chlorate ion ratio is lower than 1.15, with an inorganic acid free of chloride ion, the improvement which comprises adding a soluble inorganic chloride to the reaction mixture in an amount providing a total chloride to initial chlorate ion ratio approximating 1.15, and employing the acid in an amount providing an equivalent molar ratio of acid to initial chlorate not substantially lower than 2.15.

4. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and chloride ion in proportions such that the chloride to chlorate ion ratio is lower than 1.15, with sulfuric acid, the improvement which comprises adding a soluble inorganic chloride to the reaction mixture in an amount providing a total chloride to initial chlorate ion ratio approximating 1.15, and employing sulfuric acid in an amount providing an equivalent molar ratio of acid to initial chlorate not substantially lower than 2.15.

5. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and a soluble inorganic chloride in proportions providing a chloride to chlorate ion ratio not lower than about 1.15 and not greater than about 12.5 during substantially all of the reaction period, with an inorganic acid free of chloride ion, the improvement which comprises employing inorganic acid free of chloride ion in an amount providing an equivalent molar ratio of acid to initial chlorate not substantially lower than a ratio expressed by the equation $$H^+/ClO_3^- = 6 - 4E$$

where E is an efficiency value for the reaction falling substantially on the curve AB of Fig. 2 and substantially on the ordinate of the total chloride to initial chlorate ion ratio.

6. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and a soluble inorganic chloride in proportions providing a chloride to chlorate ion ratio not lower than about 1.15 and not greater than about 12.5 during substantially all of the reaction period, with sulfuric acid, the improvement which comprises employing sulfuric acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio.

7. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and a soluble inorganic chloride in proportions providing a chloride to chlorate ion ratio not lower than about 2 and not greater than about 12.5 during substantially all of the reaction period, with sulfuric acid, the improvement which comprises employing sulfuric acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and in an amount providing an equivalent molar ratio of acid to initial chlorate not greater than about 23.

8. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and a soluble inorganic chloride in proportions providing a chloride to chlorate ion ratio not lower than about 5 and not greater than about 12.5 during substantially all of the reaction period, with sulfuric acid, the improvement which comprises employing sulfuric acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and in an amount providing an equivalent molar ratio of acid to initial chlorate not greater than about 23.

9. In the production of gas mixtures comprising chlorine dioxide and chlorine by reacting at a temperature within the range of about 15° C. to 60° C. an aqueous reaction mixture containing water equal to about 50% to 75% by weight and having dissolved therein calcium chlorate and calcium chloride in proportions providing an initial chloride to chlorate ion ratio approximating 5, with sulfuric acid, improvement which comprises employing during substantially all of the reaction period sulfuric acid in an amount providing an equivalent molar ratio of acid to initial chlorate not substantially lower than 2.55, and in an amount providing an equivalent molar ratio of acid to initial chlorate not greater than about 23

10. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate, with hydrochloric acid, the ratio of initial chloride ion from any soluble chloride salt present to initial chlorate ion being not greater than about 9.5, the improvement which comprises employing during substantially all of the reaction period hydrochloric acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and not substantially higher than a ratio of 3.5.

11. In the production of gas mixtures comprising chlorine dioxide and chlorine by reacting at a temperature within the range of about 15°C. to 60° C. an aqueous reaction mixture containing water equal to about 50% to 75% by weight and having dissolved therein a soluble inorganic chlorate and a soluble inorganic chloride in proportions providing an initial chloride to initial chlorate ion ratio not lower than about 2 and not greater than about 9.5 with hydrochloric acid, the improvement which comprises employing during substantially all of the reaction period hydrochloric acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and not substantially higher than a ratio of 3.5.

12. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and a soluble inorganic chloride in proportions providing an initial chloride to initial chlorate ion ratio not lower than about 5 and not greater than about 9.5, with hydrochloric acid, the improvement which comprises employing during substantially all of the reaction period hydrochloric acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and not substantially higher than a ratio of 3.5.

13. In the production of gas mixtures comprising chlorine dioxide and chlorine by reacting at a temperature within the range of about 15° C. to 60° C. an aqueous reaction mixture containing water equal to about 50% to 75% by weight and having dissolved therein calcium chlorate and calcium chloride in proportions providing an initial chloride to chlorate ion ratio approximating 5, with hydrochloric acid, the improvement which comprises employing during substantially all of the reaction period hydrochloric acid in an amount providing an equivalent molar ratio of acid to initial chlorate within the range of about 2.75 to about 3.5.

14. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and a soluble inorganic chloride, with sulfuric acid, the improvement which comprises employing during substantially all of the reaction period inorganic chloride and chlorate in proportions providing a total chloride to initial chlorate ion ratio not lower than about 1.15 and not greater than about 12.5, employing sulfuric acid in an amount providing an equivalent molar ratio of acid to initial chlorate substantially in excess of a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and thereafter removing excess sulfate ion from the mixture, concentrating the remaining dilute sulfuric acid solution and returning the thus concentrated acid to further reaction with additional quantities of inorganic chlorate and chloride.

15. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate, an inorganic acid and chloride ion, the improvement which comprises employing during substantially all of the reaction period chloride ion and inorganic chlorate in proportions providing a total chloride to initial chlorate ion ratio not lower than about 1.15 and not greater than about 12.5, and employing acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and in an amount capable of producing a yield of chlorine dioxide at least as great as that produced by hydrochloric acid when the hydrogen ion to chlorate ion ratio approximates 3.5, and passing air into and through the reaction mixture at a rate such that the generated gases are diluted with upwards of 9 volumes of air for each volume of mixed gas.

16. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate, an inorganic acid and chloride ion, the improvement which comprises employing during substantially all of the reaction period chloride ion and inorganic chlorate in proportions providing a total chloride to initial chlorate ion ratio not lower than about 1.15 and not greater than about 12.5, and employing acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and in an amount capable of producing a yield of chlorine dioxide at least as great as that produced by hydrochloric acid when the hydrogen ion to chlorate ion ratio approximates 3.5, continuing the reaction until at least 75% of the chlorate has been decomposed, and thereafter substantially completing the decomposition of the remaining chlorate by heating the reaction mixture to a temperature substantially in excess of 60° C., and collecting the gaseous reaction products during the completion of the decomposition.

17. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate, with hydrochloric acid, the ratio of initial chloride ion from any soluble chloride salt present to initial chlorate ion being not greater than about 9.5, the improvement which comprises employing during substantially all of the reaction period hydrochloric acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and not substantially higher than a ratio of 3.5, continuing the reaction until at least 75% of the chlorate has been decomposed, and thereafter substantially completing the decomposition of the remaining chlorate by the addition to the reaction solution of a quantity of hydrochloric acid substantially in excess of that employed in the initial stage of the reaction and collecting the gaseous products of the second decomposition reaction.

18. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate, with hydrochloric acid, the ratio of initial chloride ion from any soluble chloride salt present to initial chlorate ion being not greater than about 9.5, the improvement which comprises employing during substantially all of the reaction period hydrochloric acid in an amount providing an equivalent molar ratio of acid to initial chlorate not substantially lower than a ratio expressed by the equation $H^+/ClO_3^- = 6 - 4E$ where E is an efficiency value for the reaction falling substantially on the curve AB of Fig. 2 and substantially on the ordinate of the total chloride to initial chlorate ion ratio, and not substantially higher than a ratio of 3.5, continuing the reaction until at least 75% of the chlorate has been decomposed, and thereafter substantially completing the decomposition of the remaining chlorate by heating the reaction mixture to a temperature substantially in excess of 60° C., after the addition thereto of a quantity of hydrochloric acid substantially in excess of that used during the initial stage of the reaction and collecting the gaseous products of the second decomposition reaction.

19. In the production of gas mixtures comprising chlorine dioxide and chlorine by reacting at a temperature within the range of about 15° C. to 60° C. an aqueous reaction mixture containing water equal to about 50% to 75% by weight and having dissolved therein calcium chlorate and calcium chloride in proportions providing an initial chloride to chlorate ion ratio approximating 5, with hydrochloric acid, the improvement which comprises employing during substantially all of the reaction period hydrochloric acid in an amount providing an equivalent molar ratio of acid to initial chlorate within the range of about 2.75 to about 3.5, continuing the reaction until at least 75% of the chlorate has been decomposed, and thereafter substantially completing the decomposition of the remaining chlorate by heating the reaction mixture to a temperature substantially in excess of 60° C., after the addition thereto of a quantity of hydrochloric acid substantially in excess of that used during the initial stage of the reaction and separately collecting the gaseous products of the second decomposition reaction.

20. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and a soluble inorganic chloride in proportions providing a chloride to chlorate ion ratio not lower than about 1.15 and not greater than about 12.5 during substantially all of the reaction period, with sulfuric acid, the improvement which comprises employing sulfuric acid in an amount providing an equivalent molar ratio of acid to initial chlorate not substantially lower than a ratio expressed by the equation $H^+/ClO_3^- = 6 - 4E$ where $E$ is an efficiency value for the reaction falling substantially on the curve AB of Fig. 2 and substantially on the ordinate of the total chloride to initial chlorate ion ratio, and in an amount providing an equivalent molar ratio of acid to initial chlorate not greater than about 23:1.

21. In the production of gas mixtures comprising chlorine dioxide and chlorine by reacting at a temperature within the range of about 15° C. to 60° C. an aqueous reaction mixture containing water equal to about 50% to 75% by weight and having dissolved therein a soluble inorganic chlorate and a soluble inorganic chloride, with sulfuric acid, the improvement which comprises employing during the course of the reaction inorganic chloride and chlorate in proportions providing a total chloride to initial chlorate ion ratio not lower than about 1.15 and not greater than about 12.5 during substantially all of the reaction period, employing sulfuric acid in an amount providing an equivalent molar ratio of acid to initial chlorate substantially in excess of a ratio expressed by the equation $H^+/ClO_3^- = 6 - 4E$ where $E$ is an efficiency value for the reaction falling substantially on the curve AB of Fig. 2 and substantially on the ordinate of the total chloride to initial chlorate ion ratio, and in an amount providing an equivalent molar ratio of acid to initial chlorate not greater than about 23:1, and thereafter removing excess sulfate ion from the mixture, concentrating the remaining dilute sulfuric acid solution and returning the thus concentrated acid to further reaction with additional quantities of inorganic chlorate and chloride.

GEORGE PAUL VINCENT.